United States Patent [19]

Hunt

[11] Patent Number: 5,740,388
[45] Date of Patent: Apr. 14, 1998

[54] APPARATUS FOR CREATING INDIVIDUALLY CUSTOMIZED VIDEOS

[75] Inventor: Gregory W. Hunt, West Chester, Pa.

[73] Assignee: Custom Communications, Inc., West Chester, Pa.

[21] Appl. No.: 644,471

[22] Filed: May 10, 1996

[51] Int. Cl.$^6$ .................................................. G06T 1/00
[52] U.S. Cl. ............... 395/328; 395/201; 395/200.01; 348/8; 360/74.1; 369/85
[58] Field of Search ............................. 395/152, 154, 395/155–161, 201–203, 211, 806, 328, 200.01, 761, 224, 226; 360/33.1, 13, 15, 131, 135, 55, 74.1; 434/221, 307; 345/125; 348/7–10, 552; 358/375; 364/514 R, 479.03–479.05; 455/3.1, 4.1; 386/52, 68, 80–82; 369/30, 34, 85

[56] References Cited

U.S. PATENT DOCUMENTS

| | | | |
|---|---|---|---|
| 4,347,568 | 8/1982 | Giguere et al. | 364/300 |
| 4,671,772 | 6/1987 | Slade et al. | |
| 4,700,070 | 10/1987 | Kovac | 250/304 |
| 4,863,384 | 9/1989 | Slade . | |
| 4,920,432 | 4/1990 | Eggers et al. | 360/33.1 |
| 4,974,254 | 11/1990 | Perine et al. | 379/100 |
| 5,099,422 | 3/1992 | Foresman et al. | |
| 5,101,364 | 3/1992 | Davenport et al. | |
| 5,109,482 | 4/1992 | Bohrman | 395/154 |
| 5,226,160 | 7/1993 | Waldron et al. | |
| 5,237,648 | 8/1993 | Mills et al. | 395/133 |
| 5,262,875 | 11/1993 | Mincer et al. | |
| 5,278,662 | 1/1994 | Womach et al. | |
| 5,305,438 | 4/1994 | MacKay et al. | |
| 5,318,450 | 6/1994 | Carver . | |
| 5,385,475 | 1/1995 | Sudman et al. | |
| 5,404,316 | 4/1995 | Klingler et al. | 364/514 |
| 5,412,416 | 5/1995 | Nemirofsky . | |
| 5,412,720 | 5/1995 | Hoarty . | |
| 5,414,455 | 5/1995 | Hooper et al. | 348/7 |
| 5,442,389 | 8/1995 | Blahut et al. | 348/7 |
| 5,442,390 | 8/1995 | Hooper et al. | 348/7 |
| 5,442,749 | 8/1995 | Northcutt et al. | |
| 5,453,779 | 9/1995 | Dan et al. | |
| 5,454,722 | 10/1995 | Holland et al. | |
| 5,461,415 | 10/1995 | Wolf et al. | |
| 5,477,263 | 12/1995 | O'Callaghan et al. | |
| 5,513,306 | 4/1996 | Mills et al. | 395/148 |
| 5,517,405 | 5/1996 | McAndrew et al. | 364/401 |
| 5,537,530 | 7/1996 | Edgar et al. | 395/157 |
| 5,539,449 | 7/1996 | Blahut et al. | 348/7 |
| 5,550,735 | 8/1996 | Slade et al. | 364/401 R |

OTHER PUBLICATIONS

Kwon et al, "PRR: Prime Round–Robin Placement for Implementing VCR Operations", IEEE, Systems, Man, and Cybernetics, 1995 International Conference, pp. 3920–3925, 1995.

Klein, "Constructing a Media Server Architecture for the Needs of the Video Industry", IEEE, Broadcasting Convention, 1995, pp. 304–309, Sep. 1995.

Lippman, "The Distributed Media Bank", IEEE, Community Networking Integrated Multimedia Service, 1994 Workshop, pp. 99–106, 1994.

Tobagi et al, "Client–Server Challenges for Digital Video", IEEE, COMPCON Spring '92 IEEE Computer Society Int'l Conference, pp. 88–91, 1992.

(List continued on next page.)

*Primary Examiner*—Joseph H. Feild
*Attorney, Agent, or Firm*—Panitch Schwarze Jacobs & Nadel, P.C.

[57] ABSTRACT

A apparatus for creating an individually customized video product from a plurality of video segments uses a central computer and one or more workstations to control the operation of a video file server and video recorders connected thereto. An operator at the workstation enters selection choices into a workstation. The apparatus uses the selection choices to select and order a subset of video segments prestored on the video file server. Each selected video segment is directly related to a selection choice. The selected and ordered subset of video segments are output to a video recorder to make the customized video product.

16 Claims, 19 Drawing Sheets

OTHER PUBLICATIONS

Kovalick, "The Video Server as a Component in Interactive Broadband Delivery Systems", IEEE, Community Networking Integrated Multimedia Service, 1994 Workshop (1st), pp. 77–85, 1994.

Application Guide for Micropolis® AV Server, Micropolis Corp., Chatsworth, CA, Publication No. 103,774, Feb. 1995, 12 pages.

Product Guide for Micropolis® AV Server, Micropolis Corp., Chatsworth, CA, Publication No. 110,902 Rev. A, publication date unknown, 14 pages.

Configuration Guide for Micropolis® AV Servers, Micropolis Corp., Chatsworth, CA, Publication No. 950403B, 1994, 5 pages.

Press Release entitled "Micropolis' New Video-on-Demand Server for the Desktop Offers Cost-Effective Network Accessibility", Micropolis Corp., Chatsworth, CA, Apr. 10, 1995, 3 pages.

Product brochure for Panasonic Model AG-VC205 Video-Computer Interface, Panasonic, Secaucus, NJ, publication date unknown, 2 pages.

Select an available video tape recorder(s)
and load with blank tape(s)

○ VTR1   ○ VTR5   ○ VTR9    ○ VTR13

○ VTR2   ○ VTR6   ○ VTR10   ○ VTR14

○ VTR3   ○ VTR7   ○ VTR11   ○ VTR15

○ VTR4   ○ VTR8   ○ VTR12   ○ VTR16

[ OK, Record to tape ]          [ Cancel ]

Fig. 7

Select items for printing:

☐ VHS Label                          Qty: [Edit]

☐ Mailing Label                      Qty: [Edit]

☐ Letter to patient with questionnaire   Qty: [Edit]

☐ File copy for system administrator     Qty: [Edit]

[ OK, Print ]                         [ Cancel ]

Fig. 8

Was the video production and printing error free?

[ No, return to print screen ]

[ No, return to VTR selection screen ]

[ No, return to specify program screen ]

[ Yes, Proceed to new program ]    [ Cancel ]

Fig. 9

Academic Tutor
Test Type
Create a custom video from:

[ Manually-graded, Standardized Test ]

[ OCR-graded Standardized Test ]

[ Custom Selection from Video Library ]

[ Cancel ]

Fig. 10

Academic Tutor - Student Registration

- Test Version
- Last Name [Edit]
- First Name [Edit]
- Address 1 [Edit]
- Address 2 [Edit]
- State [Edit]   Zipcode [Edit]
- City [Edit]
- Telephone [Edit]

[ OK ]   [ Cancel ]

Fig. 11

Academic Tutor
Specify the Custom Program

Introduction Version [▼]

○ #1   ○ #7    ○ #13   ○ #19   ○ #25   ○ #31   ○ #37
○ #2   ○ #8    ○ #14   ○ #20   ○ #26   ○ #32   ○ #38
○ #3   ○ #9    ○ #15   ○ #21   ○ #27   ○ #33   ○ #39
○ #4   ○ #10   ○ #16   ○ #22   ○ #28   ○ #34   ○ #40
○ #5   ○ #11   ○ #17   ○ #23   ○ #29   ○ #35   ○ #41
○ #6   ○ #12   ○ #18   ○ #24   ○ #30   ○ #36   ○ #42

Closing Version [▼]   [ OK ]   [ Cancel ]

Fig. 12A

Real Estate Match Finder
Select Property Type and Price Range

☐ Single Family    ☐ Condominium
☐ Urban    ☐ Suburban    ☐ Rural
☐ New Construction    ☐ 1 to 15 yrs old    ☐ 15+ years old ○ under $200M           ○ $700M to $800M
○ $200M to $300M        ○ $800 to $900M
○ $300 to $400M         ○ $1 million to $1.5 million
○ $400M to $500M        ○ $1.5 million to $2.5 million
○ $500M to $600M        ○ $2.5 million to $5 million
○ $600M to $700M        ○ over $5 million

[ OK ]    [ Cancel ]

Fig. 14

APPARATUS FOR CREATING INDIVIDUALLY CUSTOMIZED VIDEOS

FIELD OF THE INVENTION

The present invention relates generally to a system for creating video products on storage media, and, more particularly to a system for creating a customized video product based on a user's selection criteria.

BACKGROUND OF THE INVENTION

Systems for broadcasting individually customized video presentations are well-known in the prior art. Such systems are often referred to as "video on demand" or VOD. Typically, these systems provide a headend unit, such as a video file server, which contains a plurality of prestored video programs or video information. A user requests one or more programs and the headend unit delivers the programs over a communication medium for live viewing by the user on a television screen or display monitor. No provision is made to permanently capture the video programs. While a user could connect a video recorder to the incoming video signal to capture the video programs, taping functions (e.g., operation of the video recorder) must be controlled by the user, independent of the incoming video signal.

In the prior art, it is also known to assemble and edit selected video segments to create a customized video product. Typically, this process requires manually loading and unloading videotapes from machines, selecting the desired segments, and recording them onto a master tape. Copies of the master tape are then made for customers. Typical video editing and assembling equipment is complicated and must be run by a skilled operator.

Despite the large amount of video processing equipment available today, there is still a need for video processing equipment which can generate an individually customized video product from a store of video segments in a fast, user-friendly and inexpensive manner, which can select and order video segments from user-entered information, and which is under program control by a computer which coordinates both the selection of video segments and the operation of one or more video recorders used for making the video product. The present invention fills these needs.

SUMMARY OF THE INVENTION

The present invention provides a method for creating an individually customized video product from a plurality of video segments prestored on a video file server. The method includes the steps of prompting a user on a computer workstation display to enter into the workstation information, including selection choices, selecting and ordering a subset of the video segments prestored on the server corresponding to the entered selection choices, and outputting the selected and ordered subset of video segments to a video recorder for recording onto a portable storage medium. The recorded portable storage medium is the video product.

The present invention also provides an apparatus for creating an individually customized video product. The apparatus comprises a video file server for storing a plurality of video segments, at least one computer workstation having a display and input means for interaction with a user, at least one video recorder connected to the video file server for receiving video segments therefrom and for making a recording of the received segments on a portable storage medium inserted therein, and a central computer connected to the video file server, the computer workstation and the video recorder. The central computer includes means for prompting a user on the workstation display to enter into the workstation information, including selection choices, means for selecting and ordering a subset of video segments on the video file server corresponding to the entered selection choices, means for controlling the video file server to output the selected and ordered subset to the video recorder, and means for controlling the state of the video recorder in coordination with the video file server. The recorded portable storage medium is the video product.

BRIEF DESCRIPTION OF THE DRAWINGS

The foregoing summary, as well as the following detailed description of preferred embodiments of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings:

FIGS. 3–9 are screen displays associated with the flow diagram of FIGS. 2A–2G;

FIGS. 10, 11, 12A and 12B are screen displays associated with the flow diagram of FIGS. 2H and 2I; and FIGS. 13 and 14 are screen displays associated with the flow diagram of FIGS. 2J and 2K.

DETAILED DESCRIPTION OF PREFERRED EMBODIMENT

Figure 1:
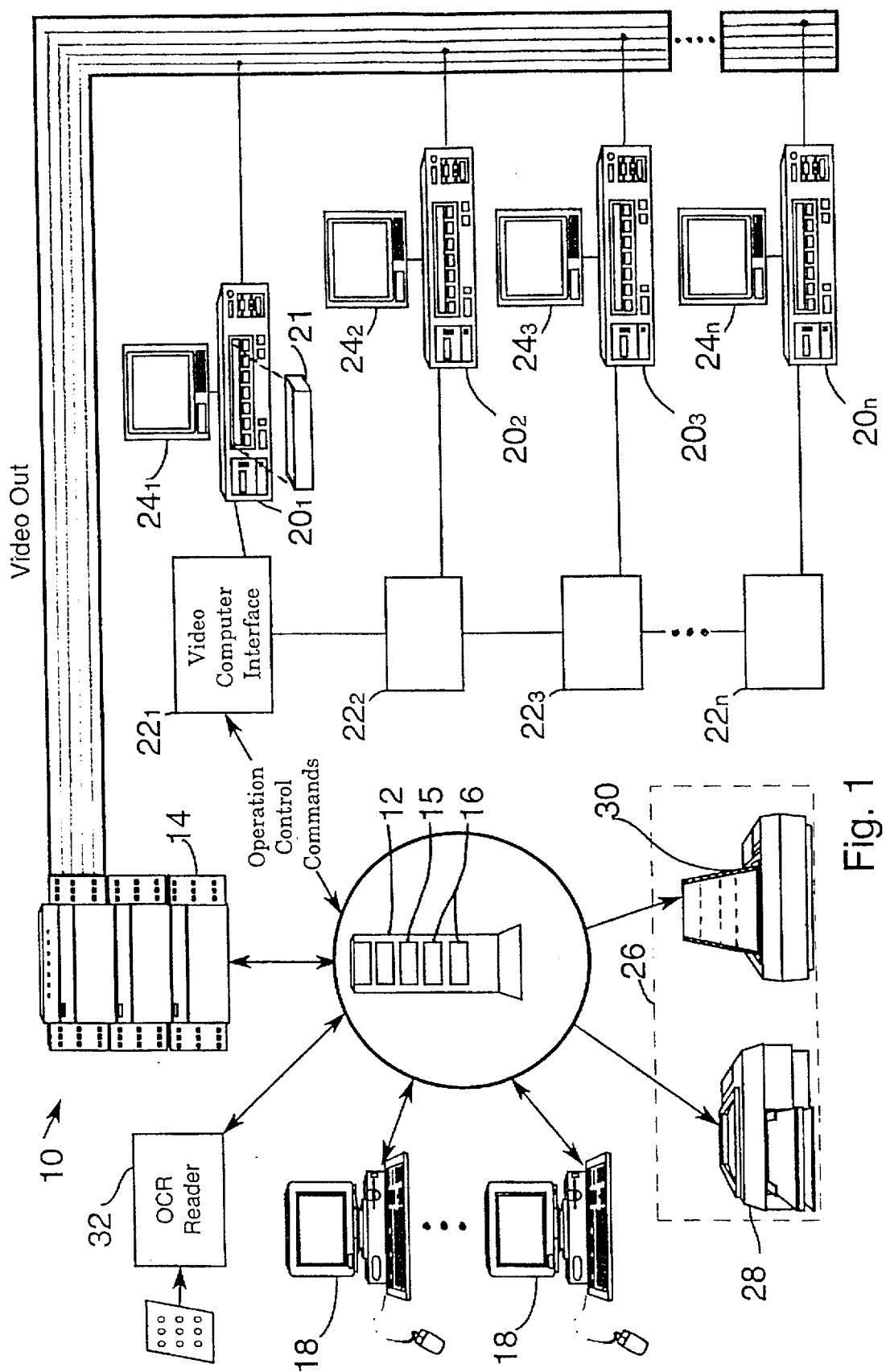
FIG. 1 is a system level schematic diagram of a customized video creation system in accordance with a preferred embodiment of the present invention.

Certain terminology is used herein for convenience only and is not to be taken as a limitation on the present invention. The word "video" means both visual and audio data. In some instances, "video" may contain only visual data (i.e., no sound) or only audio data (i.e., no picture). In the drawings, the same reference numerals are used for designating the same elements throughout the several figures.

FIG. 1 is a schematic diagram of a preferred embodiment of a system 10 for creating individually customized videos in accordance with the present invention. The system 10 has a central computer in the form of a LAN network server 12, and a video file server 14. The LAN network server 12 and video file server 14 are bidirectionally linked. The video file server 14 is preloaded with a plurality of randomly accessible video segments. The LAN network server 12 contains a network operating system 15, such as WINDOWS NT, and one or more application programs 16 for controlling the creation of the customized videos (i.e., for selecting and ordering a subset of video segments stored on the video file server 14). The LAN network server 12 is also bidirectionally linked to one or more PC workstations 18 in a star topography manner for allowing an operator at a workstation 18 to interface with the application program 16 and make selections which determine the desired subset of video segments. Each workstation 18 is equipped with input means such as a keyboard, mouse, and/or touch screen, for facilitating operator interaction. Once the subset of video segments are selected and ordered, the system 10 outputs the ordered subset of video segments from the video file server 14 to a selected video recorder 20 for creating a video product on a portable video storage medium 21 inserted in the video recorder 20. In FIG. 1, the video recorder 20 is a video tape recorder and the video storage medium 21 is a videotape. However, other types of video recorders 20 are within the scope of the invention which make video products on other video storage media, such as CD-ROMs, memory chips, or the like. Each video recorder 20 is under program control by the application program 16 through a respective video computer interface 22. In the embodiment of the invention shown in FIG. 1, there are multiple pairs of video recorders $20_1$, $20_2$, $20_3$, . . . $20_n$, and corresponding video computer interfaces $22_1$, $22_2$, $22_3$, . . . $22_n$. One video computer interface $22_1$ is connected to the LAN network server 12 via an RS-232 serial bus, and each of the remaining video computer interfaces $22_2$, $22_3$, . . . $22_n$ are connected to the video computer interface $22_1$ via RS-232 serial lines in a daisy chain arrangement. The video computer interfaces $22_1$, $22_2$, $22_3$, . . . $22_n$ can be queried by the LAN network server 12 regarding the status of the respectively attached video recorder 20. Each video recorder 20 may optionally be connected to a respective video monitor 24, such as an NTSC Monitor/Audio Monitor, for viewing the video product either during or after its creation. In addition, the system 10 includes one or more printing devices 26 connected to the LAN network server 12 for outputting printed material related to the video product, based on information entered by the operator into the workstation 18. One such printing device 26 is a letter printer 28 for generating a customized letter to the customer of the video product for delivery with the video product. Another printing device 26 is a label printer 30 for generating a label for attachment to the video product and a mailing label. The system 10 also includes an optical character reader (OCR) device 32 for processing standardized test forms. The purpose of the OCR device 32 is described below with respect to the second embodiment of the invention. The OCR device 32 is not part of the first or third embodiment of the invention.

In one preferred embodiment of the invention, the system 10 is constructed using the following hardware and software:

LAN network server 12 Compaq Prosignia 500

LAN network server 12 operating system 15 WINDOWS NT video file server 14—MicropΩlis (Micropolis) AV Server Model AV50, AV100 or 200

PC workstation 18 Compaq Prolinea E

Video recorder 20 Panasonic Model AG-1980

Video computer interface 22 Panasonic Model AG-VC205

The Micropolis AV Server is equipped with a RAIDION VOD RAID array (including video disk modules and a Gandiva™ VOD subassembly), video decoder board assembly including MPEG-1 or MPEG-2 decoder modules, and a Model PCX486 computer. The AV Server is a video storage and playback engine which can deliver video to simultaneous users with full random access capabilities. The Micropolis AV Server is available from Micropolis, Chatsworth, Calif. Video file servers from other manufacturers may also be used.

The application program 16 housed in the LAN network server 12 performs at least the following functions:

(1) creates and displays menus and menu choices on a workstation 18 for prompting a user to enter information, and receives menu selections from the workstation 18;

(2) selects and orders video segments based on the user-entered information;

(3) prompts the user to insert a video storage medium 21 of an appropriate running time into a selected video recorder 20;

(3) sends commands to the video file server 14 to deliver the selected video segments to a selected video recorder 20, while simultaneously sending control commands to a video computer interface 22 associated with the respective video recorder 20 for controlling the operation of the video recorder 20; and (4) controls the creation of letters and labels output from the printing devices 26 based, in part, on information received at the workstation 18.

The system 10 is used to create an individually customized video product from information entered into the workstation 18 and from video segments stored in the video file server 14, all under program control by a central computer (e.g., LAN network server 12) which is preferably independent from the video file server 14. One advantage of the configuration shown in FIG. 1 is that a prior art video file server 14, such as the Micropolis AV Server, may be plugged "unmodified" into the remaining components. However, it is within the scope of the invention to incorporate the functions of the LAN network server 12 into the video file server 14. In this alternative configuration, the workstations 18 and video computer interfaces 22 would be connected directly to the video file server 14 and the video file server 14 would be modified in minor ways to coordinate all data processing functions. Likewise, it is within the scope of the invention to incorporate the functions of the workstation 18 directly into the computer of the LAN network server 12.

The information entered into the workstation 18 which is used to select an ordered subset of video segments may constitute any information that is usable to determine the subset of video segments. Thus, the present invention has wide applications to virtually any field. As used herein, "information" includes at least two components, "selection choices" and "demographic data". "Selection choices" designate one choice from a subset of preprogrammed choices. The selection choices are used to determine which video segments must be assembled to create the video product. Demographic data is used by the system 10 to generate letters and mailing labels, and to maintain a database of information regarding users of the system 10. Typically, demographic data comprises the name and address of the video product customer.

Three examples of applications for the system 10 are provided below. However, these examples are not intended to limit the scope of the invention. To the contrary, the scope of the invention includes other applications wherein entered information is used to select an ordered sequence of video segments for creation of an individually customized video product. In a first embodiment of the invention, the system 10 creates a video product to be viewed by a patient before the patient undergoes a medical procedure. In a second embodiment of the invention, the system 10 creates a video product from the results of a standardized test so that a test taker may review the answers to the questions which were not answered correctly. In a third embodiment of the invention, the system 10 creates a video product from inquiries regarding real estate criteria to assist a househunter in locating a suitable property. The overall process for creating a customized video product is similar for all embodiments of the invention. Accordingly, some of the menus appearing on the workstation 18 are similar in all embodiments, whereas other menus are particular to one embodiment of the invention.

Referring to the first embodiment of the invention, a user at the workstation 18 enters information about the procedure, the doctor(s) who will be performing the procedure, the hospital where the procedure will be performed, and demographic information about the patient (e.g., name, address and the like). The entered information is used to select and assemble an ordered subset of video segments customized for the patient's needs.

The first preferred embodiment of the invention is described using an operational flow diagram of the application program 16 and sample screens which appear on the workstation 18 under program control by the application program 16. The flow diagram is shown in FIGS. 2A-2G and sample screens are shown in FIGS. 6-9. In the disclosed example, the video recorders $20_1, 20_2, 20_3, \ldots 20_n$ are video tape recorders (VTRs), each of which accepts a VHS tape.

Figures 3, 4:
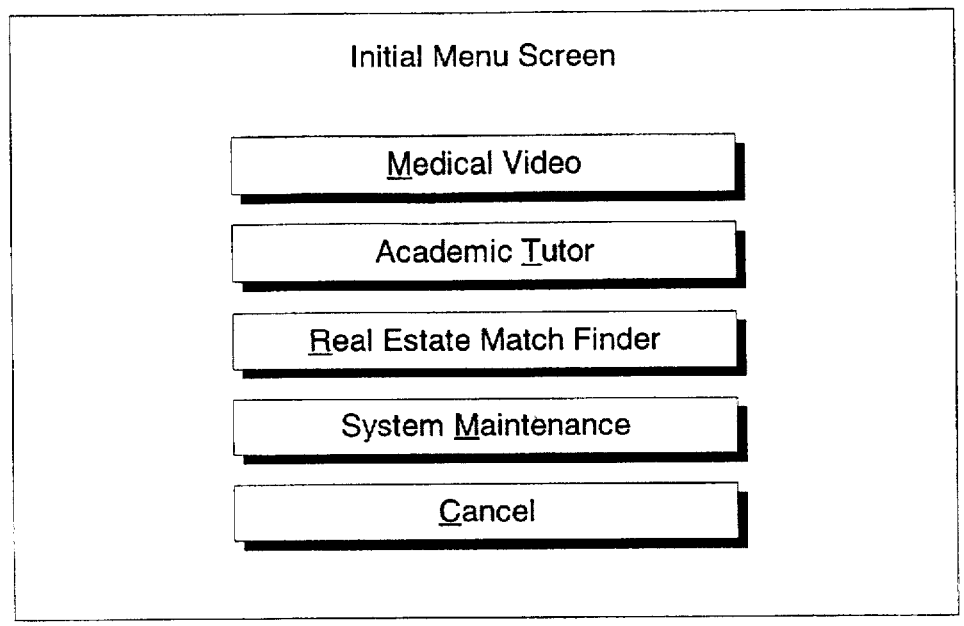
Figure 5:
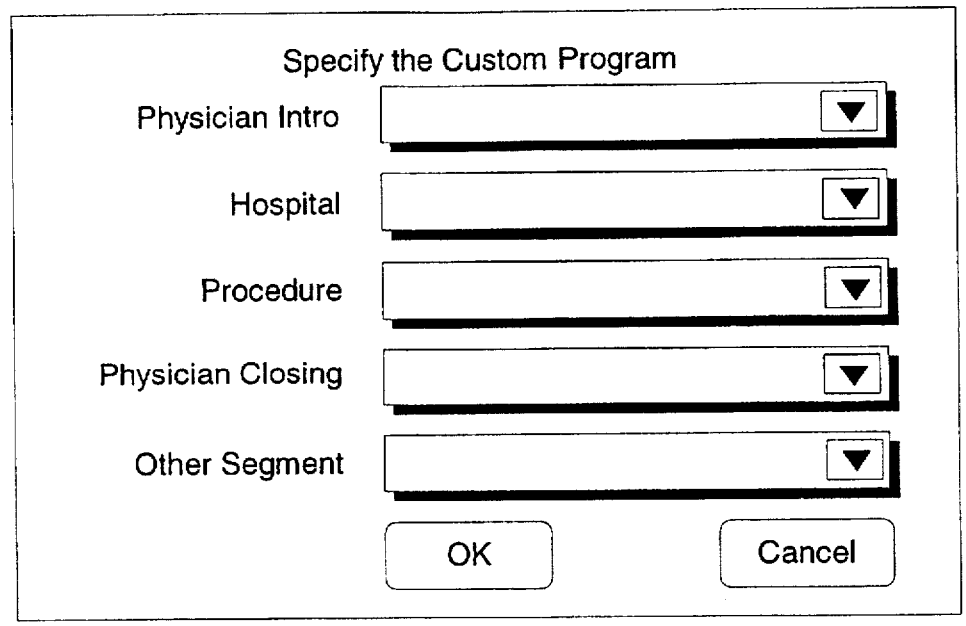
Figure 6:
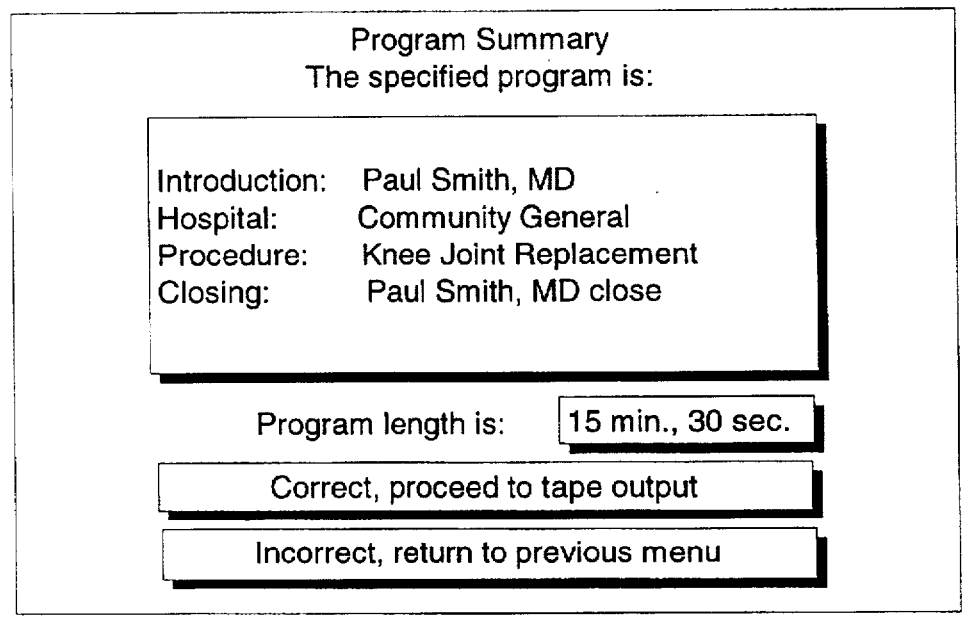

Referring to FIGS. 2A-2E and 3-8, the program 16 displays an initial menu screen on the workstation 18 (step 100), as shown in FIG. 3. A user selects "Medical Video" (step 102) and a Patient Registration menu screen appears (step 104), as shown in FIG. 4. The user fills in the patient variable fields, including the patient's name, address and phone number (steps 106-112). After all fields are filled in, the user exits the registration screen (step 114). Next, a Custom Program screen appears (step 116), as shown in FIG. 5. The user fills in the custom program fields, including a physician introduction and closing, a hospital, a medical procedure and other segments, if any, by scrolling through selections appearing in the respective fields (steps 118-124). As selections are made, a Play List is built (step 120). The physician introduction and closing identifies short prestored video segments presented by an individual physician or physicians who will be responsible for the medical procedure. Typically, the same physician is selected for both the opening or closing, although different physicians may also be selected. The hospital field identifies a prestored video segment which provides a general orientation to the patient about the hospital where the procedure is to be performed. This segment may include video about the layout and operations of the hospital, as well as general admittance and discharge information. The physician introduction and closing, and the hospital segments provide general information to the patient. In contrast, the procedure field identifies a video segment particular to the patient's medical procedure. Other video segments, if any, are selected in the Other Segment field. After the Custom Program screen is filled in with the desired selections, the user exits the screen (step 126). Next, a Program Summary screen appears (step 128), as shown in FIG. 6, for verifying the selections made by the Custom Program screen. Also, the program 16 calculates the total length of the video presentation and displays it on this screen. For example, if the physician introduction and closing segments are 2.0 minutes each, the hospital orientation segment is 5.0 minutes, and the medical procedure segment is 6.5 minutes, the total program length will be 15.5 minutes. The user verifies that the information in the Program Summary screen is accurate (130). If any information is not correct or needs to be changed, the user selects "Incorrect", the Specify Program screen reappears, and the process returns to step 116 (step 132). If the information is correct, the user selects "Correct" (step 134). Next, a Select VTR screen appears (step 136), as shown in FIG. 7. The user selects one or more of the video recorders (steps 138-144) and is prompted to load selected VTR(s) with a blank tape. More than one VTR may be selected if multiple copies of the same video product are needed. The blank tape should have a length or running time at least equal to the program length displayed on the Program Summary screen. Each selected VTR is added to a Play List Output (step 140). After the VTRs are selected, a Select Printing Screen appears (step 146), as shown in FIG. 8. The user enters a desired quantity of a VHS label, mailing label, letter to patient (with questionnaire), and file copy for the system administrator, to be produced by the printing devices 26 (step 148). The printed materials are customized for the patient and video product based on previously input information. If multiple copies of VHS tapes are made, a label would typically be requested for each tape. However, the user may only need one mailing label and one letter for the registered patient. After the quantities are entered, the printing requests are sent to a print queue (step 152).

Figure 2A:
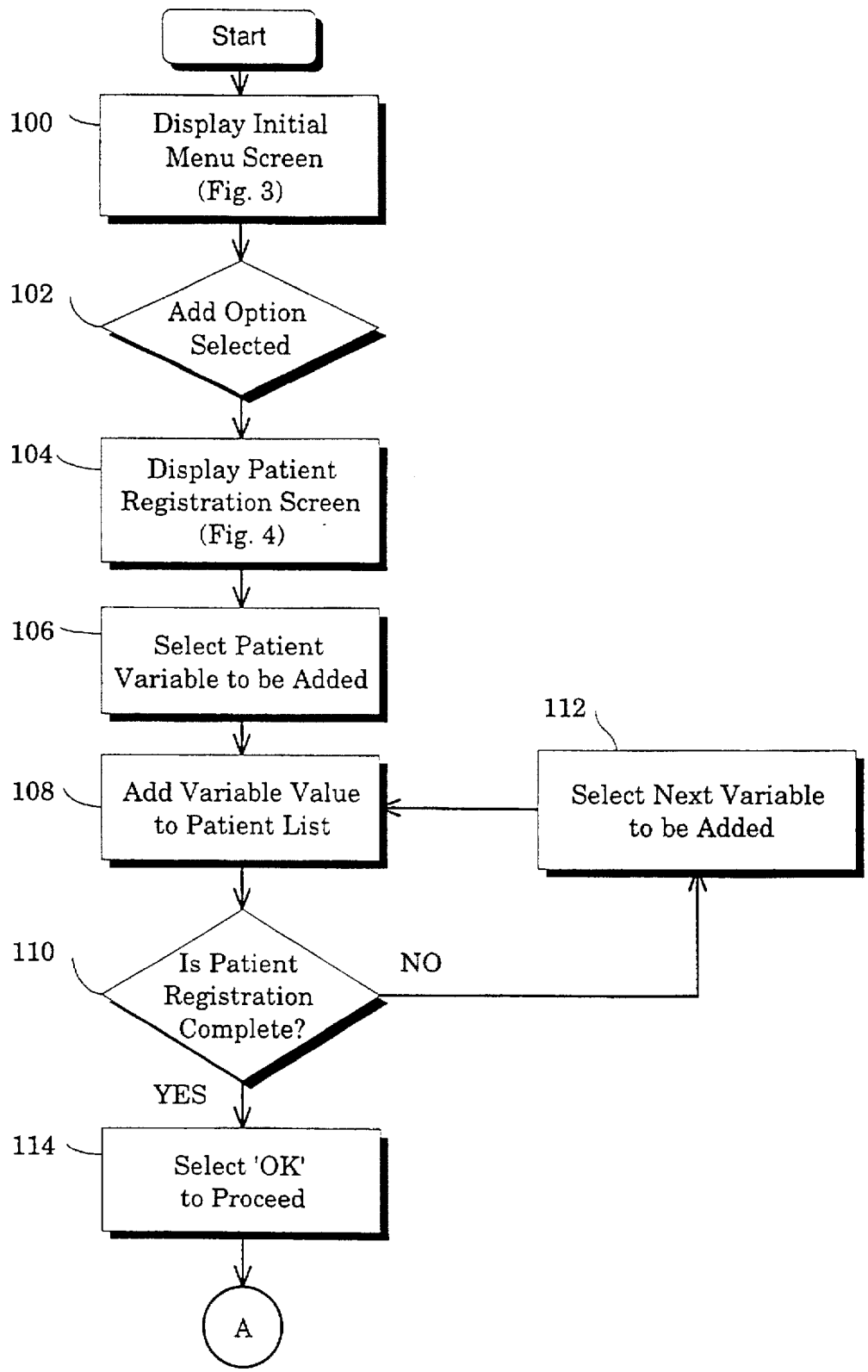
FIGS. 2A–2G, taken together, are an operational flow diagram of the program for controlling the system of FIG. 1 in accordance with a first embodiment of the invention.
Figure 2B:
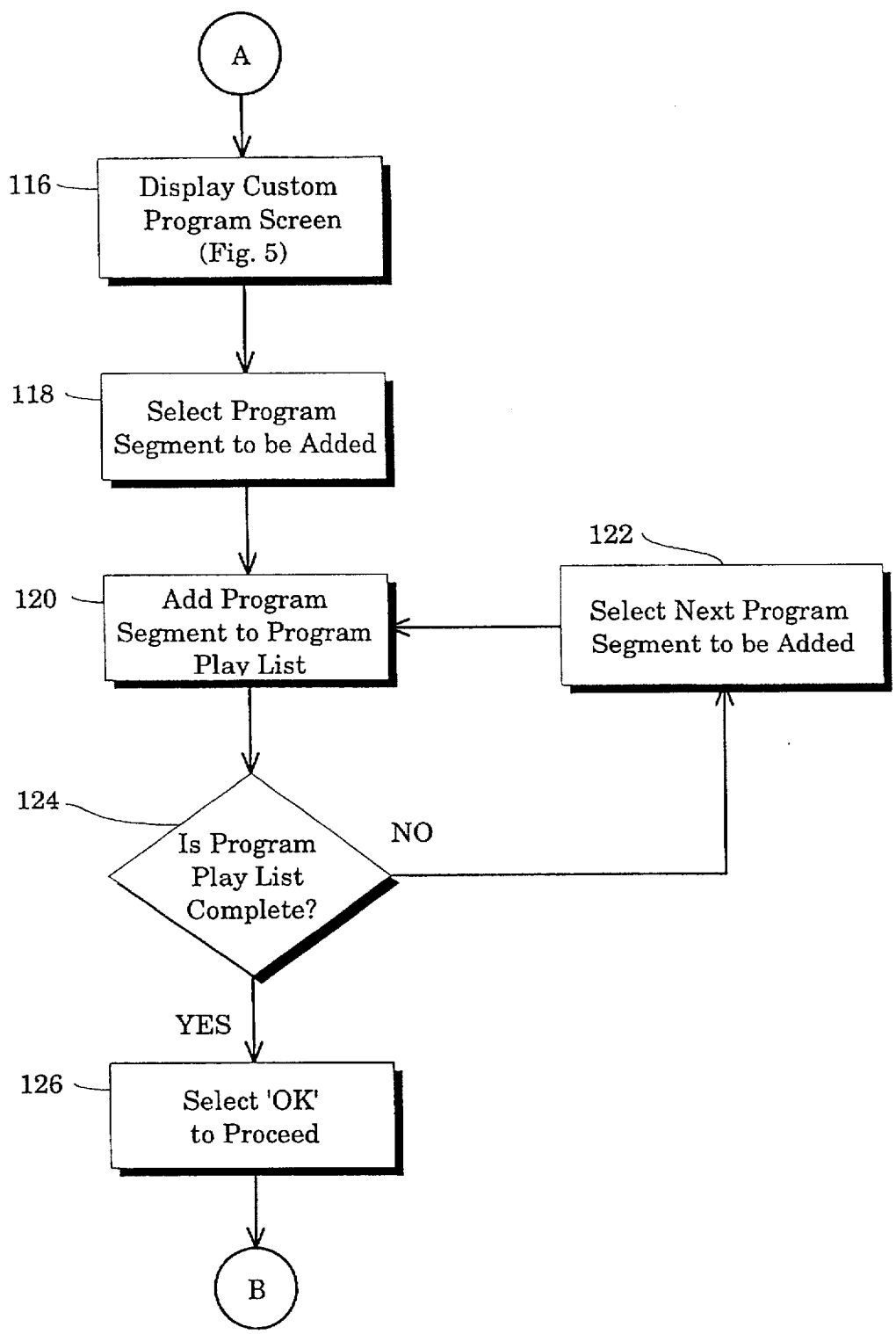
Figure 2C:
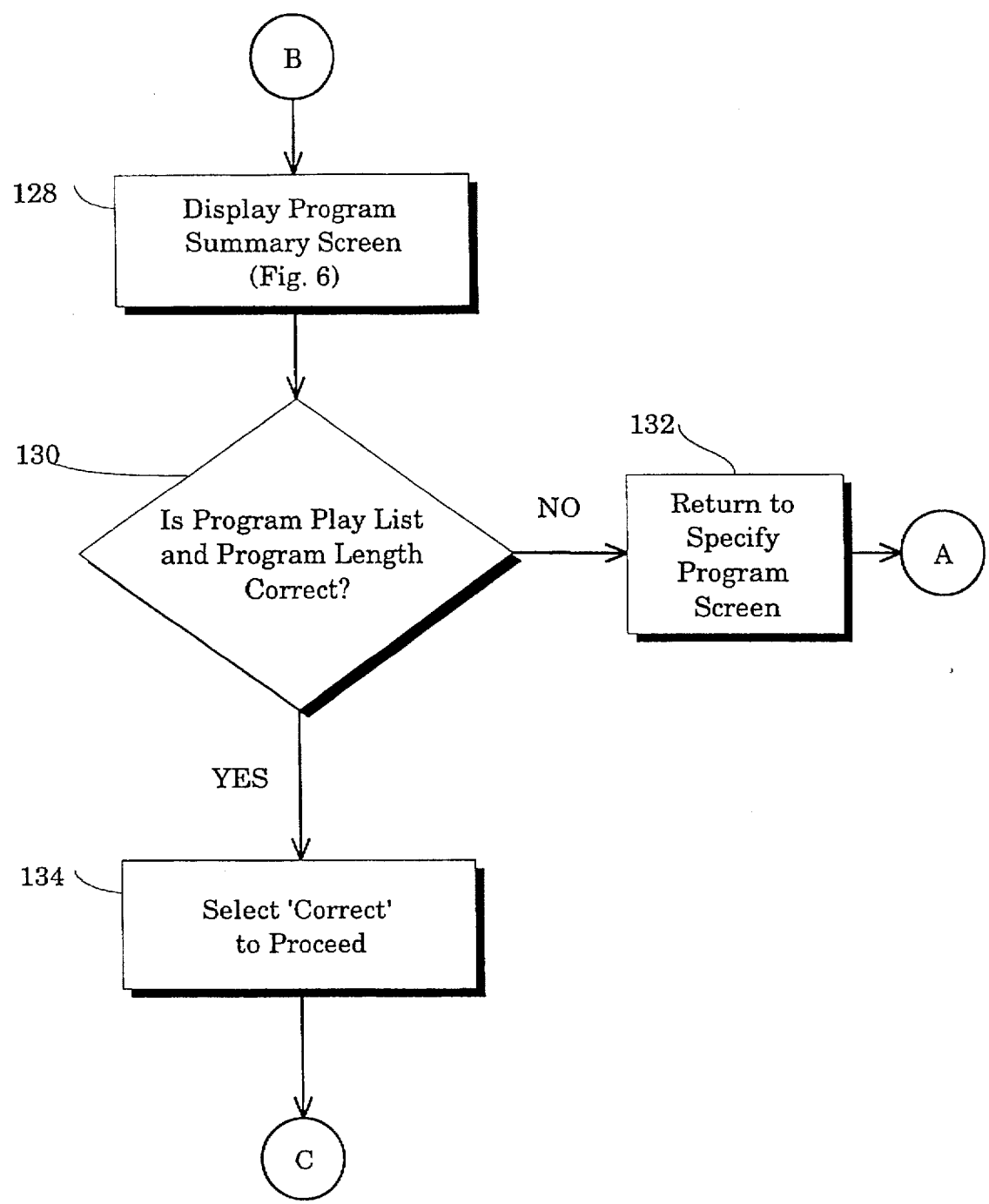
Figure 2D:
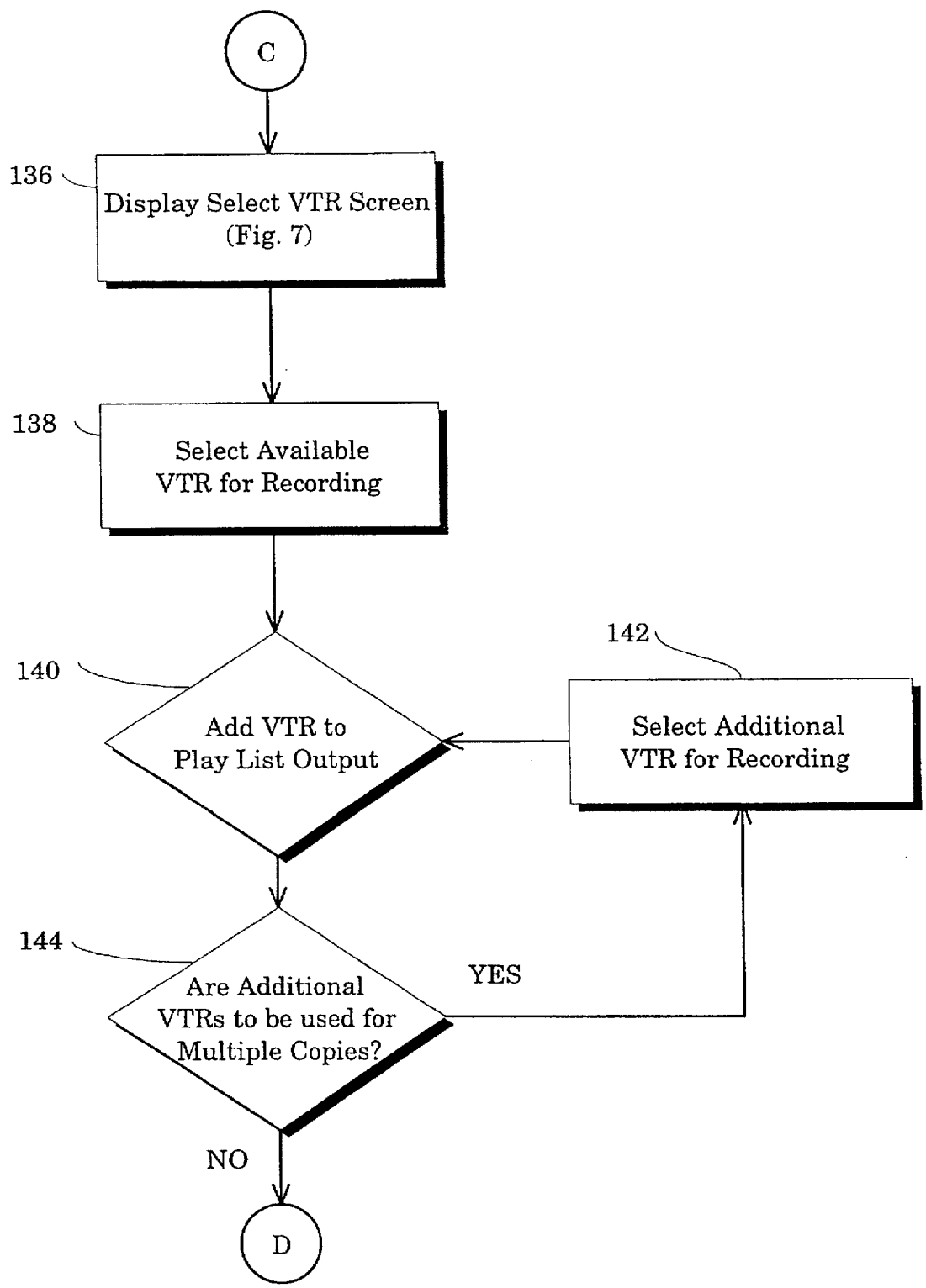
Figure 2E:
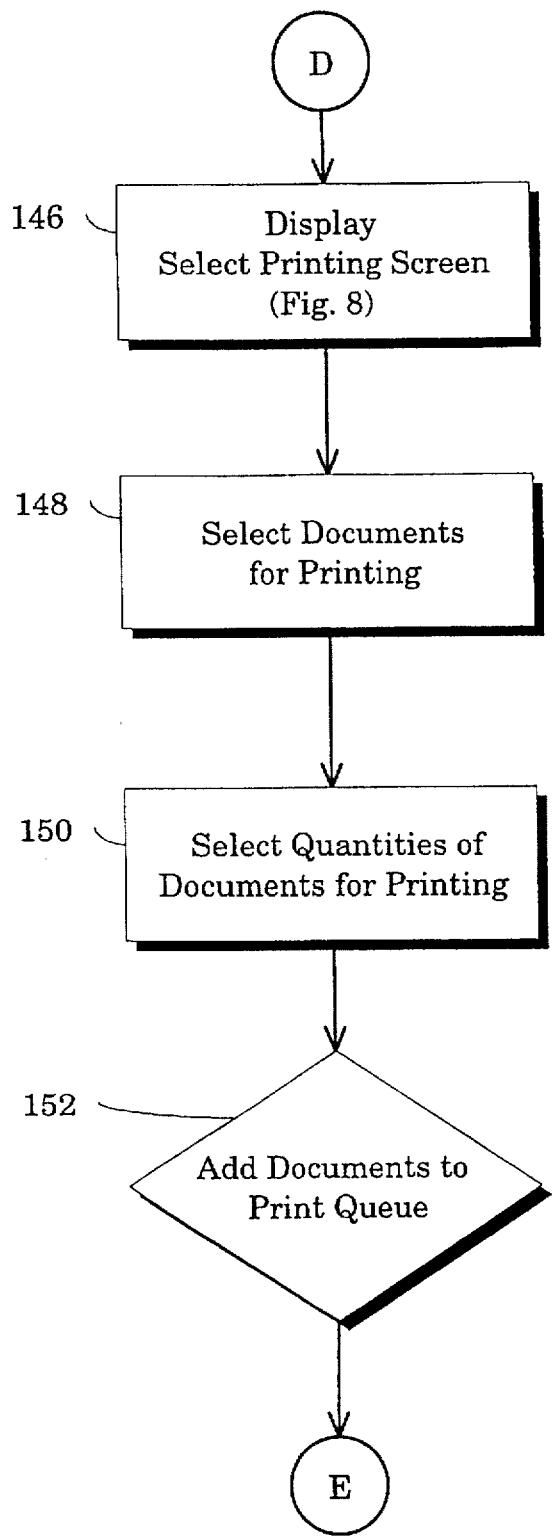
Figure 2F:
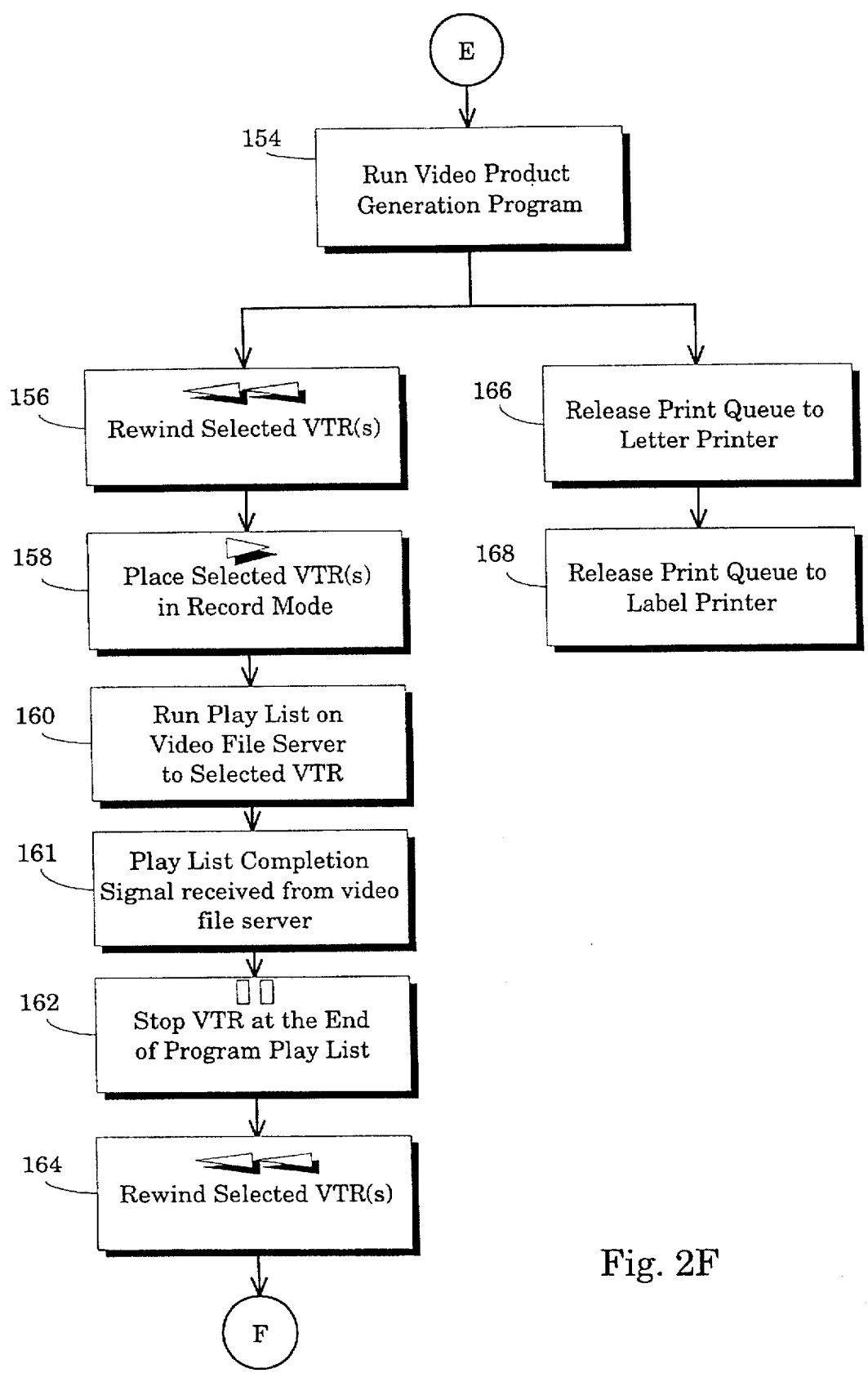
Figure 2G:
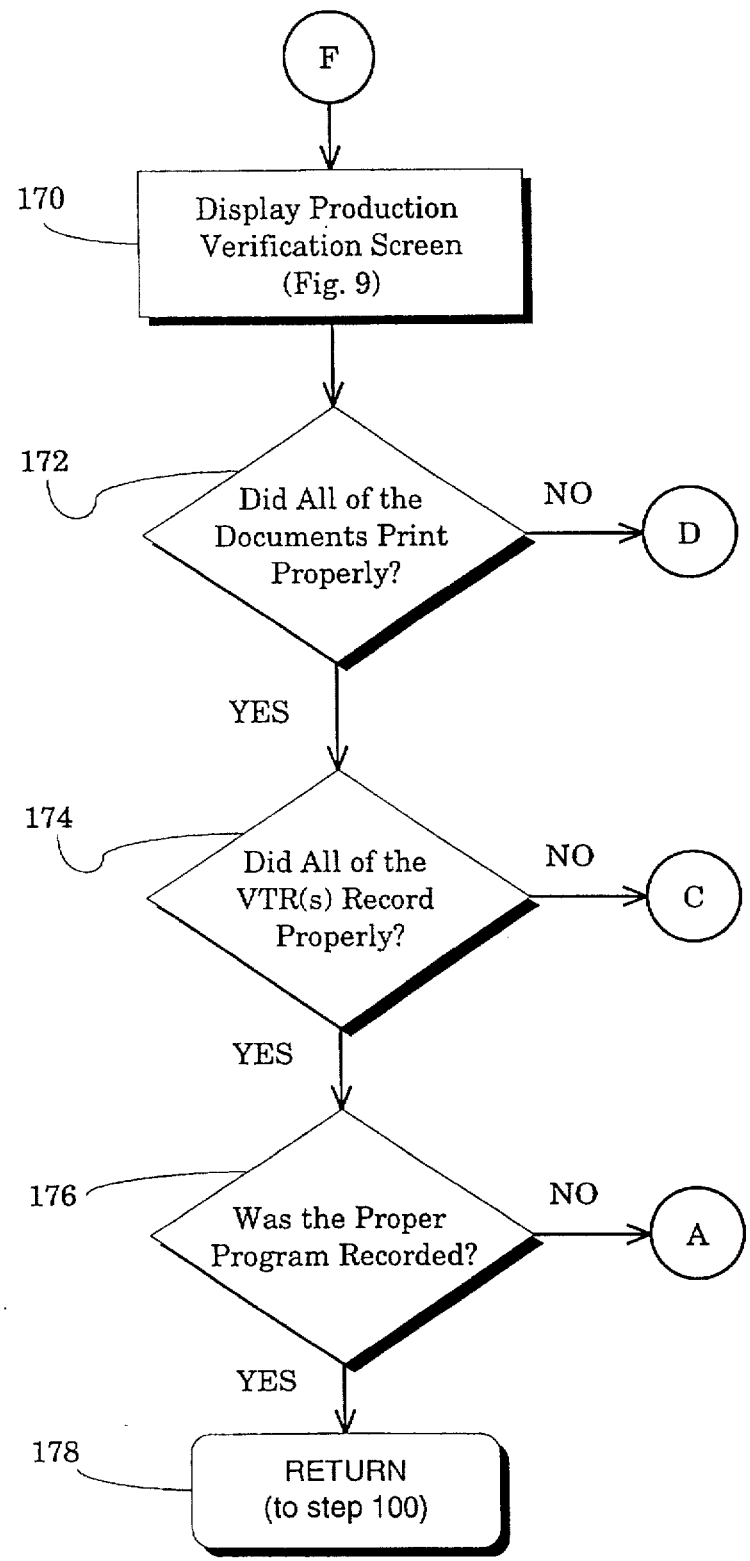
Figure 2H:
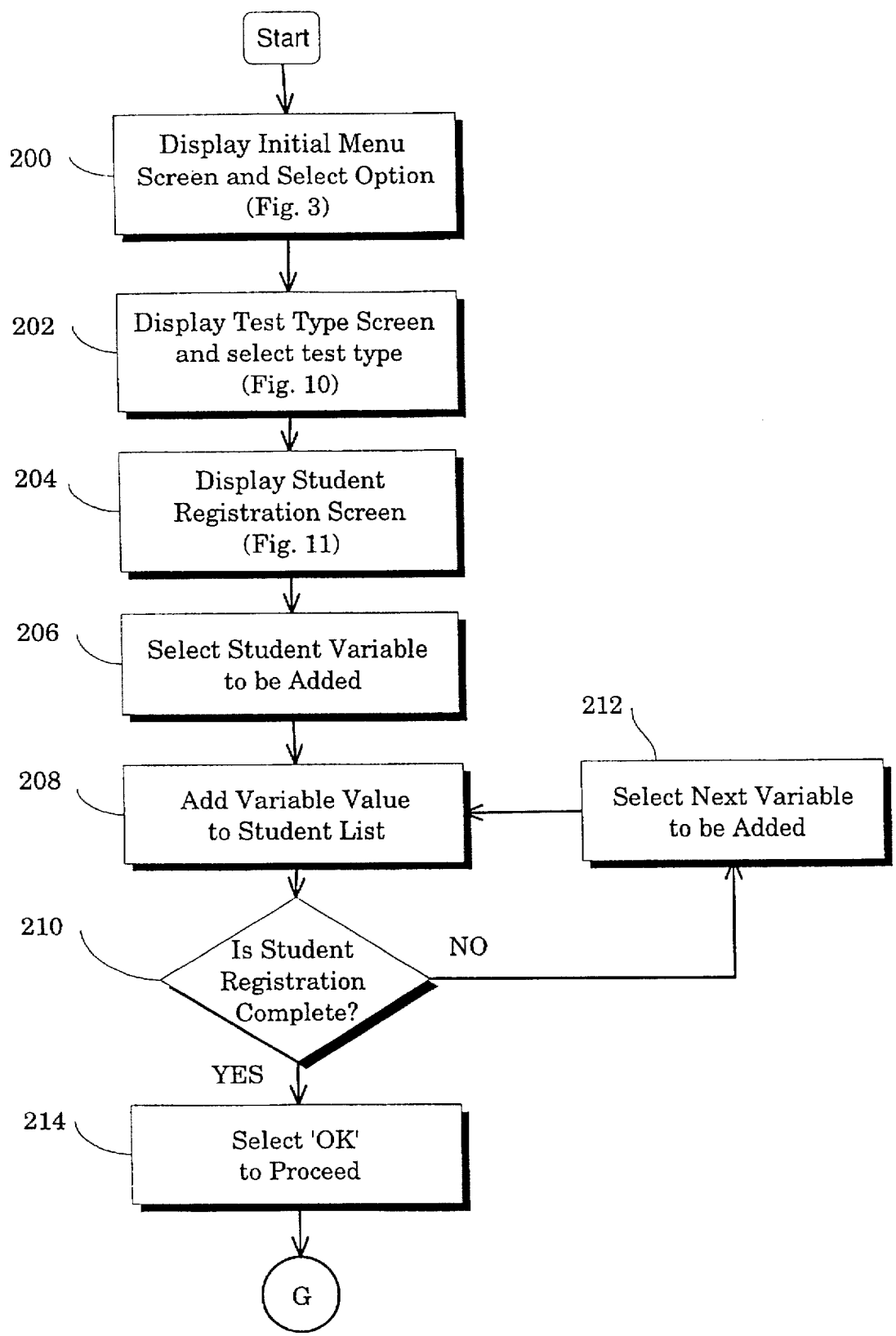
FIGS. 2H and 2I, taken together, are an operational flow diagram of the program for controlling the system of FIG. 1 in accordance with a second embodiment of the invention.
Figure 2I:
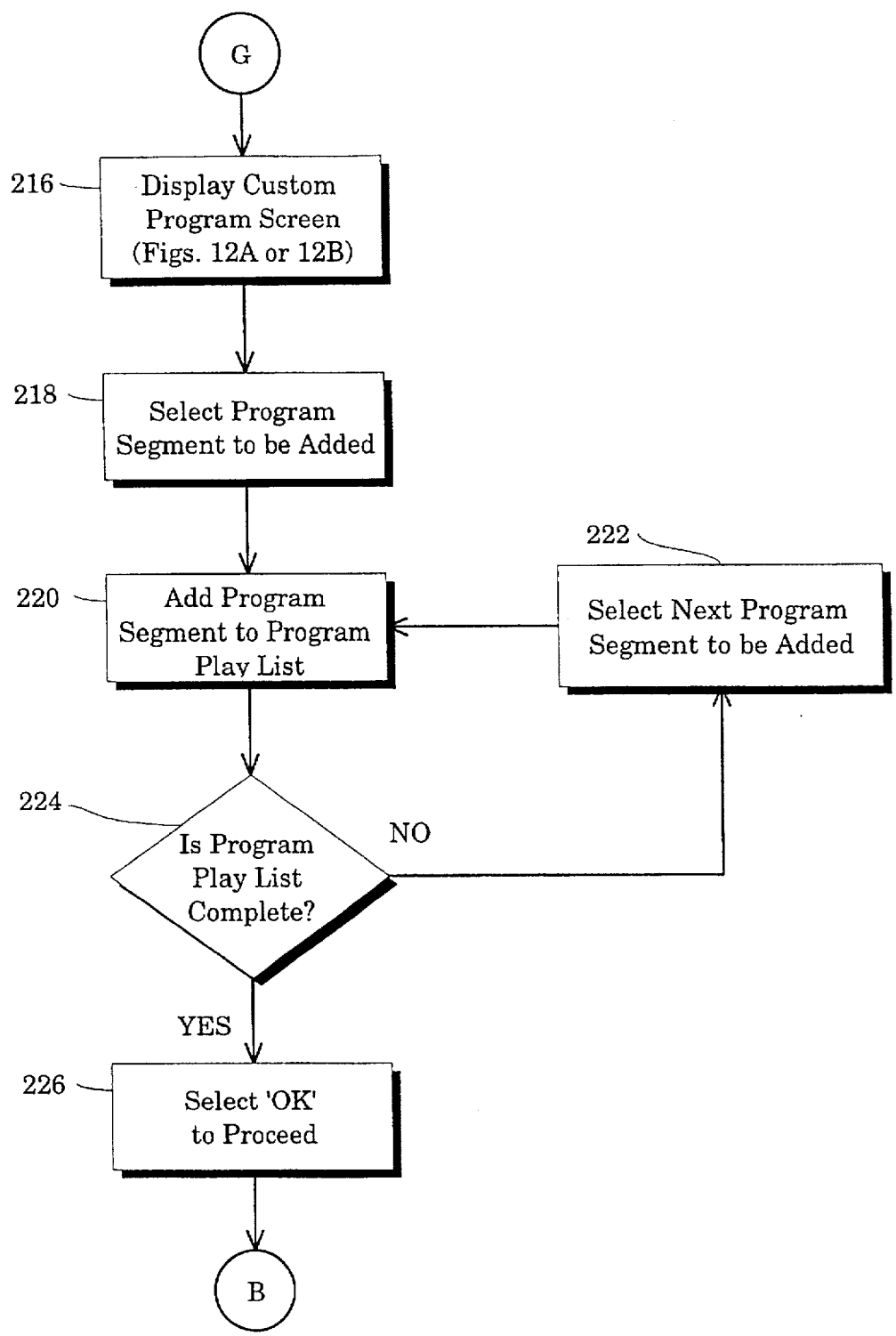
Figure 2J:
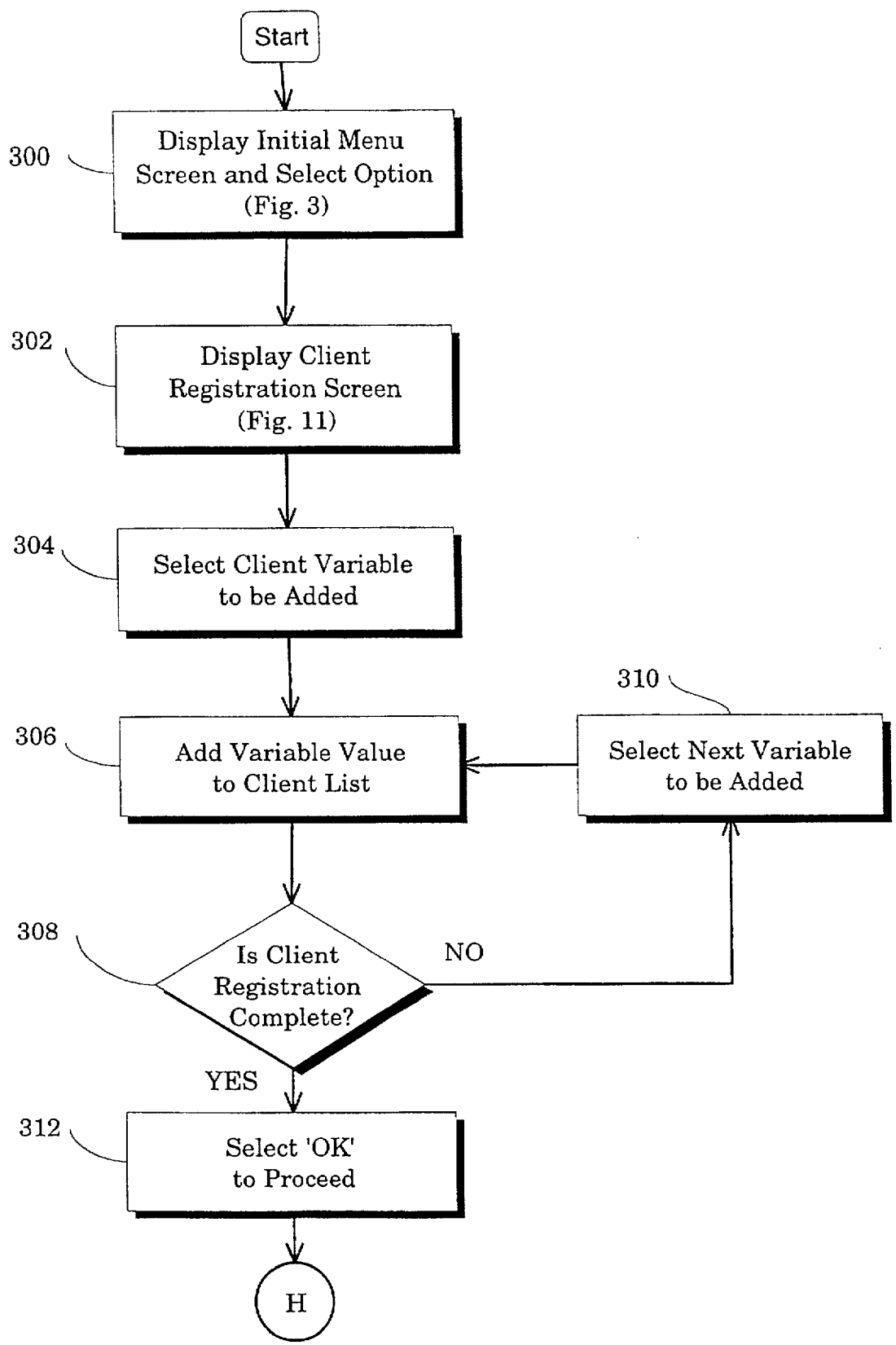
FIGS. 2J and 2K, taken together, are an operational flow diagram of the program for controlling the system of FIG. 1 in accordance with a third embodiment of the invention.
Figure 2K:
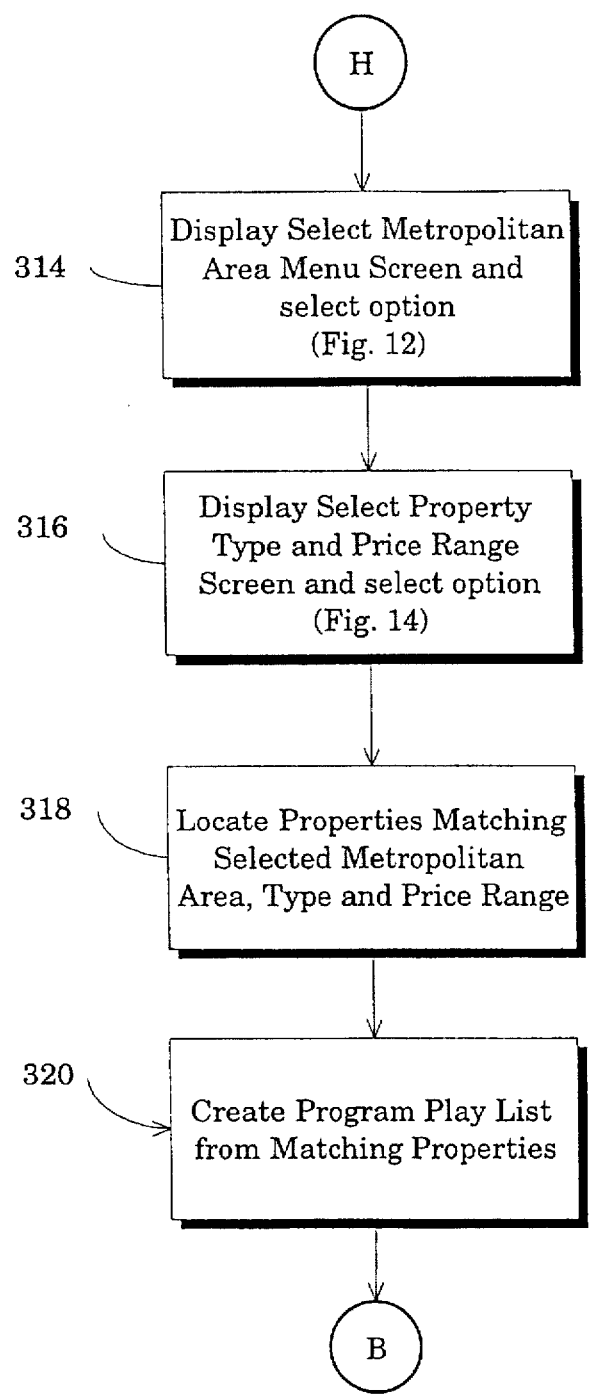

Referring next to FIGS. 2F, 2G and 9, the video product is generated (step 154). The program 16 sends a command signal to the selected VTR(s) to rewind the tape in each selected VTR (step 156) and to place the selected VTR(s) in the Record mode (step 158). Once all of the selected VTRs are in the Record mode, the program 16 directs the video file server 14 to run the Play List (step 160) generated in step 120 and to output the video directly to the VTRs. The program 16 sequences the video segments before directing the video file server 14 to run the Play List so that the introduction, orientation, medical procedure portion and closing appear in the proper order. The video output signal from the video file server 14 is sent to the VTR(s) selected in steps 138-144. All VTRs which are selected and running (i.e., loaded with a tape and in Record mode) make a video product using the video output signal. The video segments are output from the video file server 14 in a continuous manner with substantially no time delay between adjacent video segments. To present a smooth flowing presentation, the start of each video segment preferably includes a fade-up and the end of each segment preferably includes a dip to black. After the Play List is completed, a Play List completion signal is received from the video file server 14 (step 161). The program 16 stops and rewinds the VTR(s) (steps 162, 164). The program 16 may optionally eject the tape after rewinding. While steps 156-164 are being performed, the print queue is released and the letter printer 28 and label printer 30 print the documents selected by the Printing Screen (steps 166, 168). The program 16 can monitor the status of the VTR(s) through the video computer interfaces 21 which provide VTR status information in response to a query.

In one embodiment of the invention, the tape label includes the patient's name, address, physician name, hospital, medical procedure and total running time. It may also include the operator who made the tape, the date that the tape was made, and the tape machine number. The mailing label includes the patient's name and address. If the mailing label is produced directly on a courier label (e.g., Federal Express), it will also have a phone number. The letter includes the patient's name, address, a copyright warning, a questionnaire, instructions for responding to the questionnaire, and a return address envelope. The letter may also remind the patient of related matters, such as admission dates. All of the variables used to customize the letters and labels are retrieved from the database which stores the user-entered information.

After printing and video production is completed, a Production Verification Screen is displayed (step 170), as shown in FIG. 9. If there is an error in the document printing, the user returns to the Select Printing screen (step 172) and repeats the subsequent steps. If there is an error in the operation of the VTRs which caused one or more of the VCRs to fail to record properly, the user returns to the Select VTR screen (step 174) and repeats the subsequent steps. If there is an error in the content of the video product (i.e., if the proper program was not recorded), the user returns to the Specify Program screen (step 176) and repeats the subsequent steps. If the video production and printing is error-free, the user returns to the Initial Menu screen (step 178).

After completion of a production run, the label is placed on the VHS tape and the tape and corresponding letter are mailed to the patient.

The menu choices and selection screens shown in FIGS. 3–9 may be created by any suitable software program. Preferred software programs are Microsoft Developer Studio and Visual C++ 4.0 (incorporated into Developer Studio). The database requirements of the program may be met by Microsoft's Access 2.0, or any other suitable database software.

The resultant video product generated by the first embodiment of the invention is particularly useful for educating a patient about his or her upcoming medical procedure before admission. Studies have shown that pre-surgery educational program significantly reduce patient anxiety, improve outcomes and reduce the length of hospital stays. The video product can be an ideal part of such a program.

A second embodiment of the invention creates a video product from the results of a standardized test (e.g., multiple choice test) so that a test taker may review the questions which were not answered correctly. The review takes the form of a sequence of video segments explaining the correct answers to the wrongly answered questions, and optionally, explaining why the other answers are incorrect. The sequence of video segments may be used as a lesson plan to improve performance on subsequent tests.

Figure 12B:
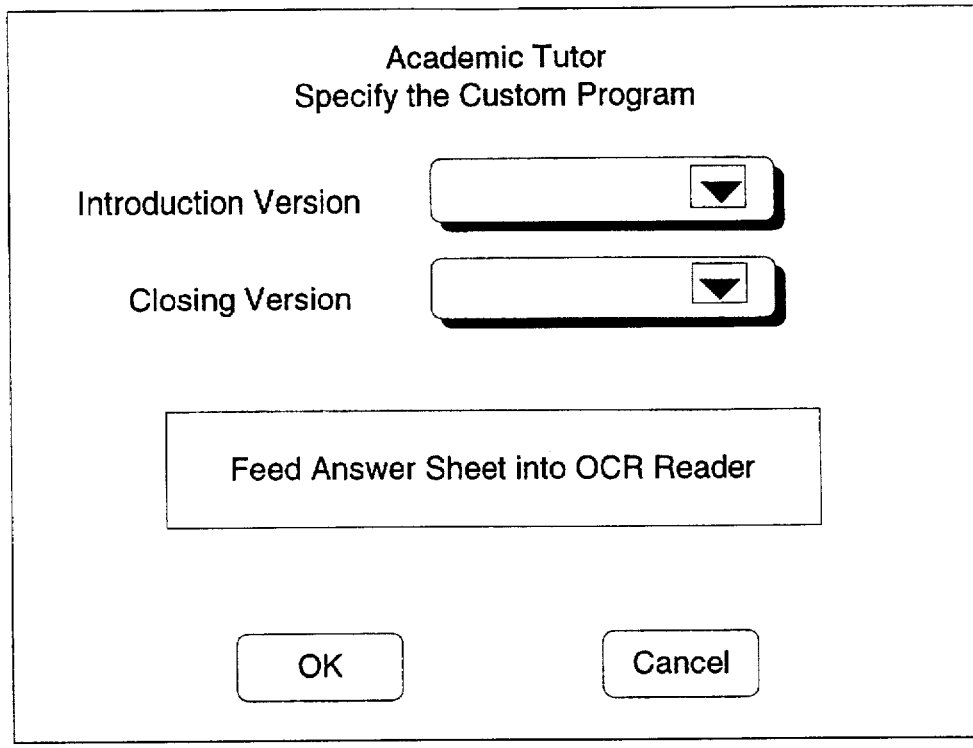

Referring to FIGS. 2H, 2I, 3, 10 and 11, the program 16 displays the initial menu screen of FIG. 3 on the workstation 18 (step 200). A user selects "Academic Tutor" (step 200) and a Test Type menu screen appears (step 202), as shown in FIG. 10. The user selects either a manually-graded test, OCR graded test, or a custom selection of test questions from a video library (step 202). Next, a Student Registration menu screen appears (step 204), as shown in FIG. 11. The Student Registration screen is similar to the Patient Registration of FIG. 4, except that there is an extra menu choice for the test version. The user fills in the fields, including the student's name, address and phone number and selects the test version (steps 206–212). After all fields are filled in, the user exits the registration screen (step 214). Next, a Custom Program screen appears (step 216), as shown in either FIGS. 12A or 12B. FIG. 12A appears if the user selected a manually-graded test in step 202. FIG. 12B appears if a user selected an OCR graded test in step 202. A specialized screen (not shown) appears if the user selected a custom selection of test questions in step 202. The user fills in the custom program fields, including the introduction Version and Closing Version by scrolling through selections appearing in the respective fields (steps 218–224). As selections are made, a Play List is built (step 220). The introduction and closing identifies short prestored video segments of pre-test preparation and strategies, and generalized strategies for test-taking. The user also selects the test questions that were erroneously answered (FIG. 12A only). If the user selected an OCR graded test in step 202, the user is prompted to feed the answer sheet into the OCR device 32 shown in FIG. 1. The OCR device 32 outputs information regarding which test questions were answered correctly and incorrectly. The program 16 uses this information in place of the "test questions in error" manually entered from the FIG. 12A screen when building the Play List.

Each test question for the selected test version is associated with a video segment that explains the correct answers to the wrongly answered questions, and optionally, explains why the other answers are incorrect. After the Custom Program screen is filled in with the desired selections, the user exits the screen (step 226). The program 16 then continues in generally the same manner as described in the first embodiment of the invention. A Program Summary Screen similar to FIG. 6 appears and the user verifies that the Introduction Version, Closing Version and test questions in error were properly selected. Next, the user fills out a Select VTR screen similar to FIG. 7 and performs the related steps shown in FIG. 2D. Next, the user fills out a Select Printing Screen similar to FIG. 8, and performs the related steps shown in FIG. 2E. Next, the Video Product Generation Program is run, and the steps of FIG. 2F are performed. The program 16 sequences the video segments before directing the video file server 14 to run the Play List so that the introduction, test question presentation portion and closing appear in the proper order. After the steps of FIG. 2F are performed, a Production Verification Screen similar to FIG. 9 appears, and the steps of FIG. 2G are performed (the NO decision output of step 176 leading to step 216, not step 116).

After completion of a production run, the label is placed on the VHS tape and the tape and corresponding letter are mailed to the patient, in the same manner as in the first embodiment.

A third embodiment of the invention creates a video product from inquiries regarding real estate criteria to assist a househunter in locating a suitable property. The video product allows a user to view a plurality of properties which meet particular criteria on a single video storage medium 21, such as a VHS tape.

Figure 13:
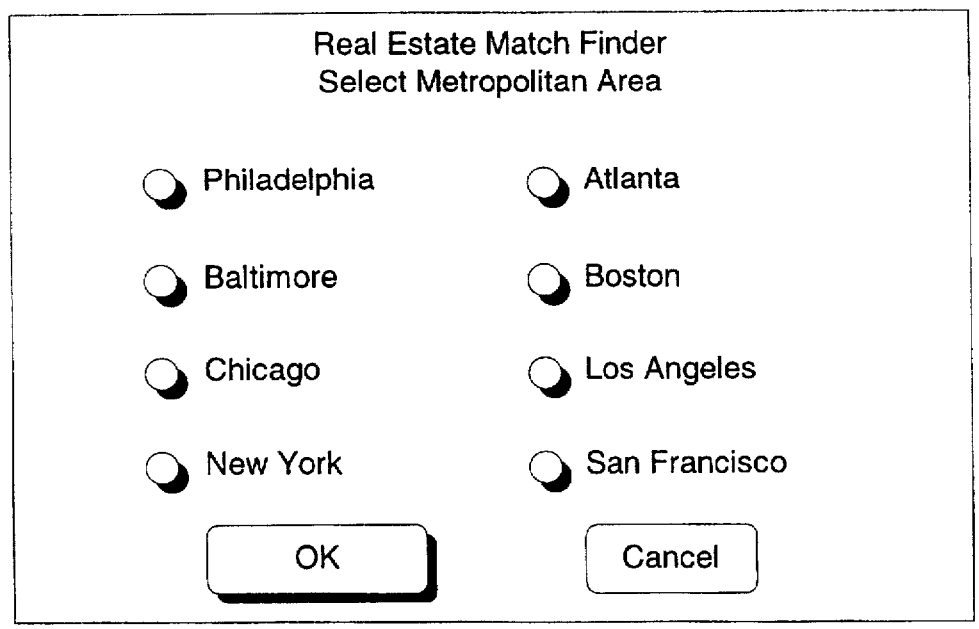

Referring to FIGS. 2J, 2K, 3, 13 and 14, the program 16 displays the initial menu screen of FIG. 3 on the workstation 18 (step 300). A user selects "Real Estate Match Finder" (step 300). Next, a client registration screen appears (step 302), which is similar to the screen shown in FIG. 4 except that "Patient Registration" reads "Client Registration". The user fills in the fields, including the client's name, address and phone number (steps 304–308). After all fields are filled in, the user exits the registration screen (step 312). Next, a Select Metropolitan Area screen appears (step 314), as shown in FIG. 13, and the user selects a metropolitan area. Next, a Select Property Type and Price Range screen appears (step 316), as shown in FIG. 14. The user selects the appropriate type and price of property. Next, all properties that match the selected metropolitan area, type and price range are located from a prestored database of properties. The database of properties is preferably stored in the computer of the LAN network server 12, and a video segment of each property is stored in the video file server 14. Next, a Play List is created from the matching properties. The program 16 then continues in generally the same manner as described in the first and second embodiments of the invention. For brevity, the remaining steps are not repeated.

While the applications of the present invention are too numerous to list, some other applications include creating a video product of recipes from a selection of recipe choices, or creating a corporate training video product which includes general video segments (e.g., orientation, message from the CEO) and customized video segments (location, division and product line information for a particular new employee).

In all embodiments of the invention, video segments are loaded into the video file server 14 in the same manner as is known in the prior art for such devices. Video segments are typically stored in the video file server 14 in digitized and compressed form. The program 16 accesses video segments using the same identification scheme that is used by prior art video file servers 14, such as the Micropolis AV Servers described above. Accordingly, video segments may be given DOS file names with readily identifiable alphabetic characters.

The above-described invention allows customized videos to be inexpensively, quickly and easily created by unskilled operators. The present invention significantly expands the potential market for customized video products to include many new applications and specialized areas.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. An apparatus for creating individually customized video products, the apparatus comprising:
   (a) a video file server for storing a plurality of video segments and adapted to simultaneously output the same or different stored video segments on plural video output channels;
   (b) at least one computer workstation having a display and input means for interaction with a user;
   (c) a plurality of video recorders connected to respective video output channels of the video file server, each video recorder being adapted to receive video segments therefrom and make a recording of the received segments on a portable storage medium inserted therein, the recorded portable storage medium being the video product; and
   (d) a central computer connected to the video file server, the computer workstation and the plurality of video recorders, the central computer including:
      (i) means for prompting a user on the workstation display to enter information into the input means of the workstation, the information including selection choices,
      (ii) means for selecting and ordering a subset of video segments on the video file server corresponding to the entered selection choices, each selected video segment being directly related to the entered information,
      (iii) means for controlling the video file server to output the selected and ordered subset to one or more of the video recorders, and
      (iv) means for controlling the state of the video recorders in coordination with the video file server.

2. An apparatus according to claim 1 wherein the selection choices include a medical procedure, and at least one of the video segments stored on the video file server corresponds to the procedure.

3. An apparatus according to claim 2 wherein the selection choices further include a doctor who performs the procedure and a hospital which performs the procedure, at least one of the video segments being a presentation by the doctor, and at least one of the video segments provides general orientation information about the hospital.

4. An apparatus according to claim 2 wherein the selection choices include a doctor who performs the procedure and a hospital which performs the procedure, at least one of the video segments being a presentation by the doctor, and at least one of the video segments provides general orientation information about the hospital.

5. An apparatus according to claim 2 wherein the selection choices include a doctor who performs the procedure and a hospital which performs the procedure, the central computer further comprising (v) means for prompting the user on the computer workstation display to enter into the workstation demographic data about a patient undergoing the procedure, and (vi) means for generating a patient questionnaire from the selection choices and demographic data for delivery with the video product.

6. An apparatus according to claim 2 wherein the selection choices include a doctor who performs the procedure and a hospital which performs the procedure, the central computer further comprising (v) means for prompting the user on the computer workstation display to enter into the workstation demographic data about a patient undergoing the procedure, and (vi) means for generating a letter to the patient from the selection choices and demographic data for delivery with the video product.

7. An apparatus according to claim 2 wherein the central computer further comprises (v) means for prompting the user on the computer workstation display to enter into the workstation demographic data about a patient undergoing the procedure, and (vi) means for generating mailing label data from the demographic data for shipping the video product, the apparatus further comprising:
   (e) a label printer connected to the central computer for receiving the mailing label data and making mailing labels.

8. An apparatus according to claim 1 wherein the means for controlling the state of the video recorder starts the video recorder in a record mode, and stops the video recorder after all selected segments are completed.

9. An apparatus according to claim 8 wherein the means for controlling the state of the video recorder rewinds the portable storage medium after all segments are completed.

10. An apparatus according to claim 1 wherein the central computer further comprises (v) means for generating label data for the video product from the information, the apparatus further comprising:
   (e) a label printer connected to the central computer for receiving the label data and making video product labels.

11. An apparatus according to claim 1 wherein the portable storage medium is a videotape.

12. An apparatus according to claim 1 further comprising a plurality of video recorders each connected to the video file server and to the central computer, the central computer further including (v) means for prompting the user on the computer workstation display to select one of the plurality of video recorders, the central computer controlling the video file server to output the selected and ordered subset of video segments to the selected video recorder.

13. An apparatus according to claim 1 wherein the central computer further comprises (v) means for calculating from the selected segments the total running time of the video product and displaying the total running time on the workstation display to allow the user to select a portable storage medium of an appropriate length for insertion into the video recorder.

14. An apparatus according to claim 1 wherein the video file server is a random access digital device, the video segments being output from the video file server in a continuous manner with substantially no time delay between adjacent video segments.

15. An apparatus according to claim 1 wherein the central computer is part of the computer workstation.

16. An apparatus according to claim 1 wherein the central computer is connected to the video file server and the computer workstation through a local area network (LAN) configuration, and the plurality of video recorders are connected to the respective output channels of the video file server through a communication link separate from the LAN configuration.

* * * * *